United States Patent
Lien et al.

(10) Patent No.: US 9,251,329 B2
(45) Date of Patent: Feb. 2, 2016

(54) BUTTON DEPRESS WAKEUP AND WAKEUP STRATEGY

(71) Applicant: Synaptics Incorporated, San Jose, CA (US)

(72) Inventors: Ty Bao Lien, Gilbert, AZ (US); Erik Jonathon Thompson, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 109 days.

(21) Appl. No.: 13/770,164

(22) Filed: Feb. 19, 2013

(65) Prior Publication Data

US 2013/0263252 A1    Oct. 3, 2013

Related U.S. Application Data

(60) Provisional application No. 61/751,739, filed on Jan. 11, 2013, provisional application No. 61/616,112, filed on Mar. 27, 2012.

(51) Int. Cl.
*G06F 21/32* (2013.01)
*G06F 1/26* (2006.01)

(52) U.S. Cl.
CPC . *G06F 21/32* (2013.01); *G06F 1/26* (2013.01)

(58) Field of Classification Search
None
See application file for complete search history.

(56) References Cited

U.S. PATENT DOCUMENTS

| 4,151,512 A | 4/1979 | Rigannati et al. |
| 4,225,850 A | 9/1980 | Chang et al. |
| 4,310,827 A | 1/1982 | Asi |
| 4,353,056 A | 10/1982 | Tsikos |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Minh Dinh
(74) *Attorney, Agent, or Firm* — Leydig, Voit & Mayer, Ltd.

(57) ABSTRACT

Disclosed is a biometric authentication system. The system comprises a biometric image sensor in an operative position with respect to a mechanical switch on a host electronic device and configured to sense biometric characteristics of a biometric object while the biometric object is operating the mechanical switch, the operating of the mechanical switch providing at least one of input and control to the host electronic device; and wake on event logic cooperating with at least one of the biometric image sensor and the host electronic device and configured to at least delay any response by the biometric image sensor or the host electronic device that increases power consumption by either the biometric image sensor or the host electronic device, beyond that needed for the performance, by at least one of the biometric image sensor and the host electronic device, of a bona fides analysis of an object being sensed while operating the mechanical switch, until a positive completion of the bona fides analysis determines that the object being sensed is an object desired to be sensed to perform a user authentication.

20 Claims, 5 Drawing Sheets

(56) References Cited

U.S. PATENT DOCUMENTS

| | | | |
|---|---|---|---|
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,582,985 A | 4/1986 | Lofberg | |
| 4,675,544 A | 6/1987 | Shrenk | |
| 4,758,622 A | 7/1988 | Gosselin | |
| 4,817,183 A | 3/1989 | Sparrow | |
| 5,076,566 A | 12/1991 | Kriegel | |
| 5,109,427 A | 4/1992 | Yang | |
| 5,140,642 A | 8/1992 | Hsu et al. | |
| 5,305,017 A | 4/1994 | Gerpheide | |
| 5,319,323 A | 6/1994 | Fong | |
| 5,325,442 A | 6/1994 | Knapp | |
| 5,359,243 A | 10/1994 | Norman | |
| 5,420,936 A | 5/1995 | Fitzpatrick et al. | |
| 5,422,807 A | 6/1995 | Mitra et al. | |
| 5,429,006 A | 7/1995 | Tamori | |
| 5,456,256 A | 10/1995 | Schneider et al. | |
| 5,543,591 A | 8/1996 | Gillespie et al. | |
| 5,569,901 A | 10/1996 | Bridgelall et al. | |
| 5,623,552 A | 4/1997 | Lane | |
| 5,627,316 A | 5/1997 | De Winter et al. | |
| 5,650,842 A | 7/1997 | Maase et al. | |
| 5,717,777 A | 2/1998 | Wong et al. | |
| 5,748,441 A | 5/1998 | Loritz et al. | |
| 5,781,651 A | 7/1998 | Hsiao et al. | |
| 5,801,681 A | 9/1998 | Sayag | |
| 5,818,956 A | 10/1998 | Tuli | |
| 5,838,306 A | 11/1998 | O'Connor | |
| 5,848,176 A | 12/1998 | Hara et al. | |
| 5,850,450 A | 12/1998 | Schweitzer et al. | |
| 5,852,670 A | 12/1998 | Setlak et al. | |
| 5,864,296 A | 1/1999 | Upton | |
| 5,887,343 A | 3/1999 | Salatino et al. | |
| 5,892,824 A | 4/1999 | Beatson et al. | |
| 5,903,225 A | 5/1999 | Schmitt et al. | |
| 5,915,757 A | 6/1999 | Tsuyama et al. | |
| 5,920,384 A | 7/1999 | Borza | |
| 5,920,640 A | 7/1999 | Salatino et al. | |
| 5,940,526 A | 8/1999 | Setlak et al. | |
| 5,963,679 A | 10/1999 | Setlak | |
| 5,995,630 A | 11/1999 | Borza | |
| 5,999,637 A | 12/1999 | Toyoda et al. | |
| 6,002,815 A | 12/1999 | Immega et al. | |
| 6,011,859 A | 1/2000 | Kalnitsky et al. | |
| 6,016,355 A | 1/2000 | Dickinson et al. | |
| 6,052,475 A | 4/2000 | Upton | |
| 6,067,368 A | 5/2000 | Setlak et al. | |
| 6,073,343 A | 6/2000 | Petrick et al. | |
| 6,076,566 A | 6/2000 | Lowe | |
| 6,088,585 A * | 7/2000 | Schmitt et al. | 455/411 |
| 6,098,175 A | 8/2000 | Lee | |
| 6,118,318 A | 9/2000 | Fifield et al. | |
| 6,134,340 A | 10/2000 | Hsu et al. | |
| 6,148,094 A * | 11/2000 | Kinsella | 382/124 |
| 6,157,722 A | 12/2000 | Lerner et al. | |
| 6,161,213 A | 12/2000 | Lofstrom | |
| 6,175,407 B1 | 1/2001 | Santor | |
| 6,182,076 B1 | 1/2001 | Yu et al. | |
| 6,182,892 B1 | 2/2001 | Angelo et al. | |
| 6,185,318 B1 | 2/2001 | Jain et al. | |
| 6,234,031 B1 | 5/2001 | Suga | |
| 6,241,288 B1 | 6/2001 | Bergenek et al. | |
| 6,259,108 B1 | 7/2001 | Antonelli et al. | |
| 6,289,114 B1 | 9/2001 | Mainguet | |
| 6,292,272 B1 | 9/2001 | Okauchi et al. | |
| 6,317,508 B1 | 11/2001 | Kramer et al. | |
| 6,320,394 B1 | 11/2001 | Tartagni | |
| 6,325,285 B1 | 12/2001 | Baratelli | |
| 6,327,376 B1 | 12/2001 | Harkin | |
| 6,332,193 B1 | 12/2001 | Glass et al. | |
| 6,333,989 B1 | 12/2001 | Borza | |
| 6,337,919 B1 | 1/2002 | Duton | |
| 6,343,162 B1 | 1/2002 | Saito et al. | |
| 6,346,739 B1 | 2/2002 | Lepert et al. | |
| 6,347,040 B1 | 2/2002 | Fries et al. | |
| 6,357,663 B1 | 3/2002 | Takahashi et al. | |
| 6,360,004 B1 | 3/2002 | Akizuki | |
| 6,362,633 B1 | 3/2002 | Tartagni | |
| 6,392,636 B1 | 5/2002 | Ferrari et al. | |
| 6,399,994 B2 | 6/2002 | Shobu | |
| 6,400,836 B2 | 6/2002 | Senior | |
| 6,408,087 B1 | 6/2002 | Kramer | |
| 6,459,804 B2 | 10/2002 | Mainguet | |
| 6,473,072 B1 | 10/2002 | Comiskey et al. | |
| 6,509,501 B2 | 1/2003 | Eicken et al. | |
| 6,525,547 B2 | 2/2003 | Hayes | |
| 6,525,932 B1 | 2/2003 | Ohnishi et al. | |
| 6,539,101 B1 | 3/2003 | Black | |
| 6,580,816 B2 | 6/2003 | Kramer et al. | |
| 6,597,289 B2 | 7/2003 | Sabatini | |
| 6,628,812 B1 | 9/2003 | Setlak et al. | |
| 6,631,201 B1 | 10/2003 | Dickinson et al. | |
| 6,643,389 B1 | 11/2003 | Raynal et al. | |
| 6,672,174 B2 | 1/2004 | Deconde et al. | |
| 6,738,050 B2 | 5/2004 | Comiskey et al. | |
| 6,741,729 B2 | 5/2004 | Bjorn et al. | |
| 6,757,002 B1 | 6/2004 | Oross et al. | |
| 6,766,040 B1 | 7/2004 | Catalano et al. | |
| 6,785,407 B1 | 8/2004 | Tschudi et al. | |
| 6,799,275 B1 | 9/2004 | Bjorn et al. | |
| 6,836,230 B2 | 12/2004 | Le Pailleur et al. | |
| 6,838,905 B1 | 1/2005 | Doyle | |
| 6,873,356 B1 | 3/2005 | Kanbe et al. | |
| 6,886,104 B1 | 4/2005 | McClurg et al. | |
| 6,897,002 B2 | 5/2005 | Teraoka et al. | |
| 6,898,299 B1 | 5/2005 | Brooks | |
| 6,912,299 B1 | 6/2005 | Hoshino | |
| 6,924,496 B2 | 8/2005 | Manansala | |
| 6,937,748 B1 | 8/2005 | Schneider et al. | |
| 6,941,001 B1 | 9/2005 | Bolle et al. | |
| 6,941,810 B2 | 9/2005 | Okada | |
| 6,950,540 B2 | 9/2005 | Higuchi | |
| 6,959,874 B2 | 11/2005 | Bardwell | |
| 6,963,626 B1 | 11/2005 | Shaeffer et al. | |
| 6,970,584 B2 | 11/2005 | O'Gorman et al. | |
| 6,980,672 B2 | 12/2005 | Saito et al. | |
| 6,983,882 B2 | 1/2006 | Cassone | |
| 7,013,030 B2 | 3/2006 | Wong et al. | |
| 7,020,591 B1 | 3/2006 | Wei et al. | |
| 7,030,860 B1 | 4/2006 | Hsu et al. | |
| 7,031,670 B2 | 4/2006 | May | |
| 7,035,443 B2 | 4/2006 | Wong | |
| 7,042,535 B2 | 5/2006 | Katoh et al. | |
| 7,043,644 B2 | 5/2006 | DeBruine | |
| 7,046,230 B2 | 5/2006 | Zadesky et al. | |
| 7,064,743 B2 | 6/2006 | Nishikawa | |
| 7,099,496 B2 | 8/2006 | Benkley | |
| 7,110,574 B2 | 9/2006 | Haruki et al. | |
| 7,110,577 B1 | 9/2006 | Tschud | |
| 7,113,622 B2 | 9/2006 | Hamid | |
| 7,126,389 B1 | 10/2006 | McRae et al. | |
| 7,129,926 B2 | 10/2006 | Mathiassen et al. | |
| 7,136,514 B1 | 11/2006 | Wong | |
| 7,146,024 B2 | 12/2006 | Benkley | |
| 7,146,026 B2 | 12/2006 | Russon et al. | |
| 7,146,029 B2 | 12/2006 | Manansala | |
| 7,184,581 B2 | 2/2007 | Johansen et al. | |
| 7,190,209 B2 | 3/2007 | Kang et al. | |
| 7,190,816 B2 | 3/2007 | Mitsuyu et al. | |
| 7,194,392 B2 | 3/2007 | Tuken et al. | |
| 7,197,168 B2 | 3/2007 | Russo | |
| 7,200,250 B2 | 4/2007 | Chou | |
| 7,251,351 B2 | 7/2007 | Mathiassen et al. | |
| 7,258,279 B2 | 8/2007 | Schneider et al. | |
| 7,260,246 B2 | 8/2007 | Fujii | |
| 7,263,212 B2 | 8/2007 | Kawabe | |
| 7,263,213 B2 | 8/2007 | Rowe | |
| 7,289,649 B1 | 10/2007 | Walley et al. | |
| 7,290,323 B2 | 11/2007 | Deconde et al. | |
| 7,308,121 B2 | 12/2007 | Mathiassen et al. | |
| 7,308,122 B2 | 12/2007 | McClurg et al. | |
| 7,321,672 B2 | 1/2008 | Sasaki et al. | |

(56) References Cited

U.S. PATENT DOCUMENTS

| | | |
|---|---|---|
| 7,356,169 B2 | 4/2008 | Hamid |
| 7,360,688 B1 | 4/2008 | Harris |
| 7,369,685 B2 | 5/2008 | DeLean |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,046 B2 | 10/2011 | Franza et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,180,118 B2 * | 5/2012 | Neil et al. .................. 382/124 |
| 8,181,031 B2 * | 5/2012 | Narayanaswami ........... 713/186 |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 8,616,451 B1 * | 12/2013 | Rao .............................. 235/439 |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0001711 A1 | 1/2005 | Doughty et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hofmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |

(56) References Cited

U.S. PATENT DOCUMENTS

| | | |
|---|---|---|
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0181521 A1 | 8/2006 | Perreault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0238878 A1 | 10/2008 | Wang |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0083850 A1* | 3/2009 | Fadell et al. .................. 726/19 |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0075631 A1 | 3/2010 | Black et al. |
| 2010/0083000 A1 | 4/2010 | Kesanupalli et al. |
| 2010/0117794 A1 | 5/2010 | Adams et al. |
| 2010/0119124 A1 | 5/2010 | Satyan |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Dean et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0082791 A1 | 4/2011 | Baghdasaryan et al. |
| 2011/0083018 A1 | 4/2011 | Kesanupalli et al. |
| 2011/0083170 A1 | 4/2011 | Kesanupalli et al. |
| 2011/0083173 A1 | 4/2011 | Baghdasaryan et al. |
| 2011/0090047 A1 | 4/2011 | Patel |
| 2011/0102567 A1 | 5/2011 | Erhart |
| 2011/0102569 A1 | 5/2011 | Erhart |
| 2011/0134251 A1 | 6/2011 | Kim et al. |
| 2011/0175703 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Ehart |
| 2012/0257032 A1 | 10/2012 | Benkley |
| 2012/0308092 A1 | 12/2012 | Benkley et al. |
| 2013/0021044 A1 | 1/2013 | Thompson et al. |
| 2013/0259329 A1 | 10/2013 | Wickboldt et al. |
| 2013/0279768 A1* | 10/2013 | Boshra .................. 382/124 |
| 2014/0026208 A1* | 1/2014 | Coons .................. 726/16 |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| JP | 01094418 A2 | 4/1989 |
| JP | 04158434 A2 | 6/1992 |
| JP | 2002330202 A | 11/2002 |
| JP | 2005011002 A | 1/2005 |
| JP | 2005242856 | 9/2005 |

(56) References Cited

FOREIGN PATENT DOCUMENTS

| | | |
|---|---|---|
| JP | 2007305097 A | 11/2007 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

"bona fide, adv. and adj." OED Online. Oxford University Press, Jun. 2014. Web. Jul. 17, 2014.

Blackberry. 2002. Research in Motion Limited, Waterloo, Ontario, Canada.

Droid. 2009. Lucasfilm Ltd., San Francisco, CA, USA USA.

* cited by examiner

|  | LOW POWER WOE | HIGH POWER CPU | |
|---|---|---|---|
| STAGE 1 | POLLING | SLEEPING | SLEEPING |
| STAGE 2 | NOT POLLING | AWAKE-CALCULATING TO VALIDATE | SLEEPING |
| STAGE 3 | NOT POLLING | AWAKE | AWAKE |
FIG. 5
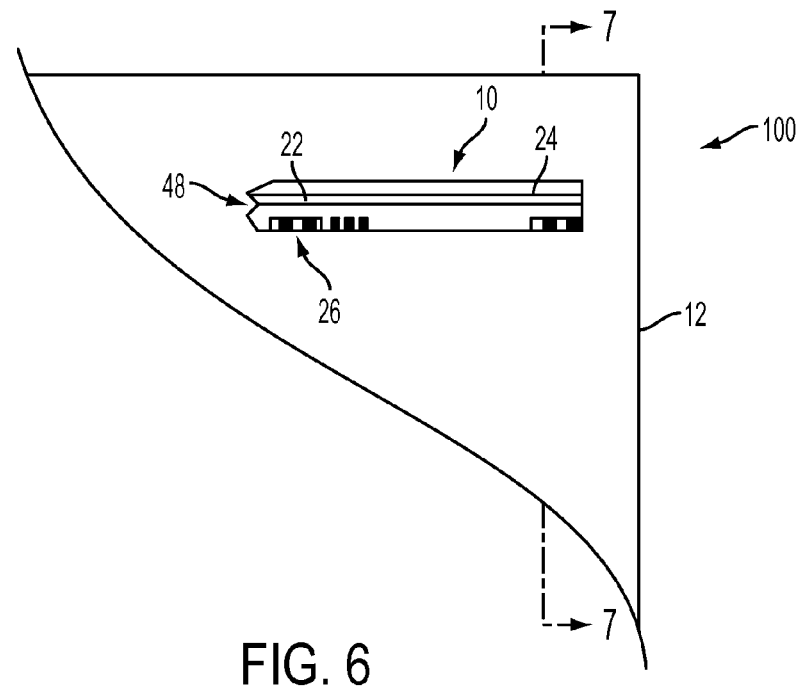
FIG. 6
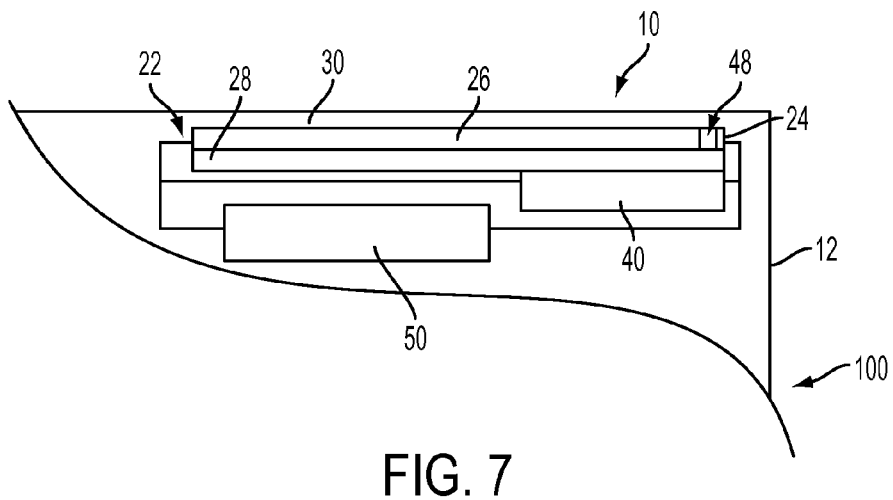
FIG. 7

BUTTON DEPRESS WAKEUP AND WAKEUP STRATEGY

CROSS-REFERENCE

This application claims the benefit of U.S. Provisional Patent Applications, Ser. Nos. 61/751,739, entitled TIERED WAKEUP STRATEGY, filed on Jan. 11, 2013, and 61/616,112, entitled BIOMETRIC OBJECT SENSOR AND METHOD, filed on Mar. 27, 2012, which applications are incorporated herein by reference.

This application is also related to the subject matter covered in co-pending U.S. patent application Ser. No. 13/759,852, entitled METHODS AND SYSTEMS FOR ENROLLING BIOMETRIC DATA (Russo) filed Feb. 5, 2013, U.S. Patent App., Pub. No. US 2013/0272586 A1, which application is co-pending with the present application, owned by the assignee of the present application, and incorporated herein by reference.

BACKGROUND

Fingerprint scanners are currently integrated in some host electronic devices. While the physical integration of scanners within host electronic devices as been achieved, the integration of functions between the scanners and the host devices has yet to be perfected. What is needed but has not been provided is a physical integration of a scanner with an operating portion of the host electronic device, such as a button, e.g., the home button on a cell phone. Currently, numerous host digital devices can contain, as an example, a user authentication apparatus, e.g., a finger scanner that can be utilized to authenticate user identities, e.g., utilizing an image of the user's fingerprint to match against a stored template fingerprint image and/or otherwise matching, e.g., utilizing biometric minutia, such as, fingerprint minutia, extracted from such an image. Many such devices are portable and battery powered. It is therefore essential that the power consumed by the operation of the finger scanners be kept to a minimum. What is needed, but has yet been provided, is a digital device that can contain a biometric scanner, such as a finger image scanner, which operates with a minimum of power consumption.

INCORPORATION BY REFERENCE

All publications, patents, and patent applications mentioned in this specification are herein incorporated by reference to the same extent as if each individual publication, patent, or patent application was specifically and individually indicated to be incorporated by reference and for all purposes and as if the entire contents of each, including claims and figures, where appropriate, were completely reproduced in the present application.

SUMMARY

It will be understood by those skilled in the art that the disclosed subject matter relates to a method and apparatus that may comprise a biometric authentication system that may comprise a biometric image sensor in an operative position with respect to a mechanical switch on a host electronic device and configured to sense biometric characteristics of a biometric object while the biometric object is operating the mechanical switch, the operating of the mechanical switch providing at least one of input and control to the host electronic device. The apparatus and method may also comprise a wake on event logic cooperating with at least one of the biometric image sensor and the host electronic device and configured to at least delay any response by the biometric image sensor or the host electronic device that increases power consumption by either the biometric image sensor or the host electronic device, beyond that needed for the performance, by at least one of the biometric image sensor and the host electronic device, of a bona fides analysis of an object being sensed while operating the mechanical switch, until a positive completion of the bona fides analysis determines that the object being sensed is an object desired to be sensed to perform a user authentication.

The biometric authentication method and system may further comprise the wake on event logic being configured to complete a wake on event power-up or power-on sequence for at least one of the biometric image sensor and the host electronic device in response to a positive outcome of the bona fides analysis The biometric authentication system and method may further comprise the biometric comprising a fingerprint and the bona fides analysis determining whether the object being sensed comprises a finger of a live human being. The system and method may further comprise the biometric image sensor comprising a sensor substrate comprising a flexible material having sensor elements formed in or on the flexible material and configured to deform enough to operate the mechanical switch. The system and method may further comprise the bona fides analysis comprising an analysis of a partial fingerprint image in contact with or in the vicinity of the biometric image sensor. The biometric authentication system and method may further comprise the wake on event logic being is configured to cause the commencement of the bona fides analysis when the wake on event logic senses an object in the vicinity of the sensor, or in contact with the sensor and before the button is depressed or in contact with the sensor and upon or after the button being depressed.

The method may comprise a biometric authentication method which may comprise using a biometric image sensor in an operative position with respect to a mechanical switch on a host electronic device to sense biometric characteristics of a biometric object while the biometric object is operating the mechanical switch, the operating of the mechanical switch providing at least one of input and control to the host electronic device; and using wake on event logic, cooperating with at least one of the biometric image sensor and the host electronic device, to at least delay any response by the biometric image sensor or the host electronic device that increases power consumption by either the biometric image sensor or the host electronic device, beyond that needed for the performance, by at least one of the biometric image sensor and the host electronic device, of a bona fides analysis of the biometric object being sensed while operating the mechanical switch, until a positive completion of the bona fides analysis determines that the object being sensed is an object desired to be sensed to perform a user authentication.

Also disclosed is a machine readable medium storing instructions that, when executed by a computing device, cause the computing device to perform a method, the method comprising: using a biometric image sensor in an operative position with respect to a mechanical switch on a host electronic device to sense biometric characteristics of a biometric object while the biometric object is operating the mechanical switch, the operating of the mechanical switch providing at least one of input and control to the host electronic device; and using wake on event logic, cooperating with at least one of the biometric image sensor and the host electronic device, to at least delay any response by the biometric image sensor or the host electronic device that increases power consumption by either the biometric image sensor or the host electronic device, beyond that needed for the performance, by at least one of the biometric image sensor and the host electronic device, of a bona fides analysis of the biometric object being sensed while operating the mechanical switch, until a positive completion of the bona fides analysis determines that the object being sensed is an object desired to be sensed to perform a user authentication.

It will also be understood by those skilled in the art that the disclosed subject matter provides a biometric authentication system wherein a biometric image sensor can be incorporated into a user authentication apparatus providing user authentication, e.g., for controlling access to one of an electronic user device or an electronically provided service. The electronic user device may comprise at least one of a portable phone and a computing device. The electronically provided service may comprise at least one of providing access to a web site or to an email account. The biometric image sensor may be incorporated into a user authentication apparatus providing user authentication for controlling an online transaction. The user authentication apparatus may be a replacement of at least one of a user password or personal identification number. The user authentication apparatus may be incorporated into an apparatus providing user authentication for controlling access to a physical location, or providing user authentication demonstrating the user was present at a certain place at a certain time. The user authentication apparatus may be incorporated into an apparatus providing at least one of a finger motion user input or navigation input to a computing device. The user authentication apparatus may be incorporated into an apparatus providing authentication of the user to a user device and the performance by the user device of at least one other task, e.g., specific to a particular finger of the user. The user authentication apparatus may be incorporated into an apparatus providing user authentication for purposes of making an on-line transaction non-repudiatable.

BRIEF DESCRIPTION OF THE DRAWINGS

The novel features of the disclosed subject matter are set forth with particularity in the appended claims. A better understanding of the features and advantages of the present disclosed subject matter will be obtained by reference to the following detailed description that sets forth illustrative embodiments, in which the principles of the disclosed subject matter are utilized, and the accompanying drawings of which:

FIG. 5 shows a chart of a tiered wakeup system according to aspects of embodiments of the disclosed subject matter;

FIG. 6 shows a partly schematic illustration of a cut-away portion of a biometric sensor and a cut-away portion of a host electronic device, according to aspects of embodiments of the disclosed subject matter; and FIG. 7 shows a partly schematic illustration of a cut-away portion of a biometric sensor and a cut-away portion of a host electronic device, along lines 7-7 in FIG. 6, according to aspects of embodiments of the disclosed subject matter.

DETAILED DESCRIPTION

Figure 1:
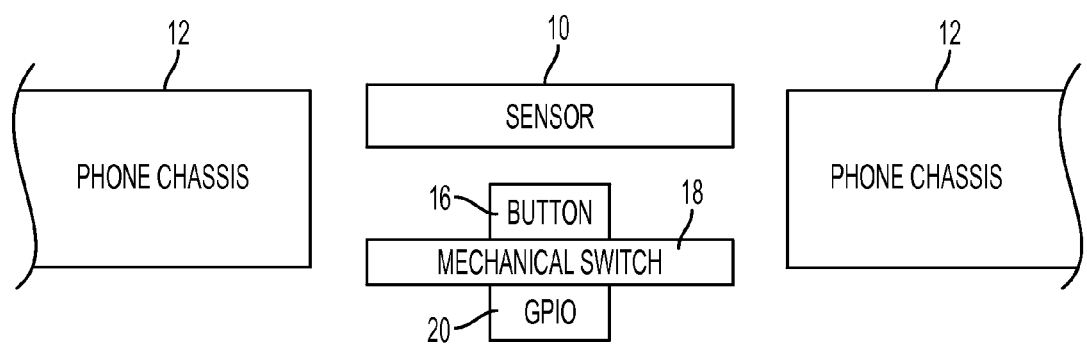
FIG. 1 is a schematic drawing of an assembly of a sensor of a fingerprint scanner that is integrated with a button on a host electronic device, such as a cell phone, according to aspects of embodiments of the disclosed subject matter.
Figure 2:
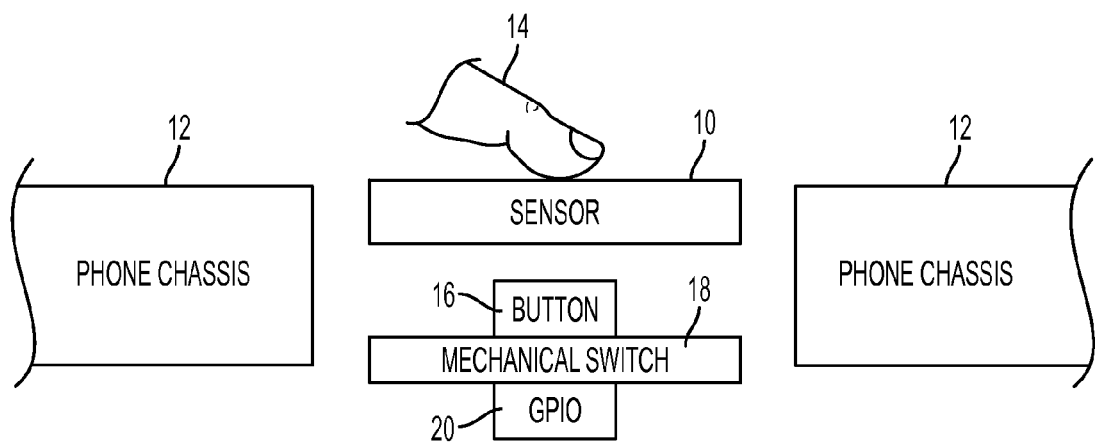
FIG. 2 is a schematic drawing which is identical to FIG. 1, except a finger is positioned on the sensor, according to aspects of embodiments of the disclosed subject matter.
Figure 3:
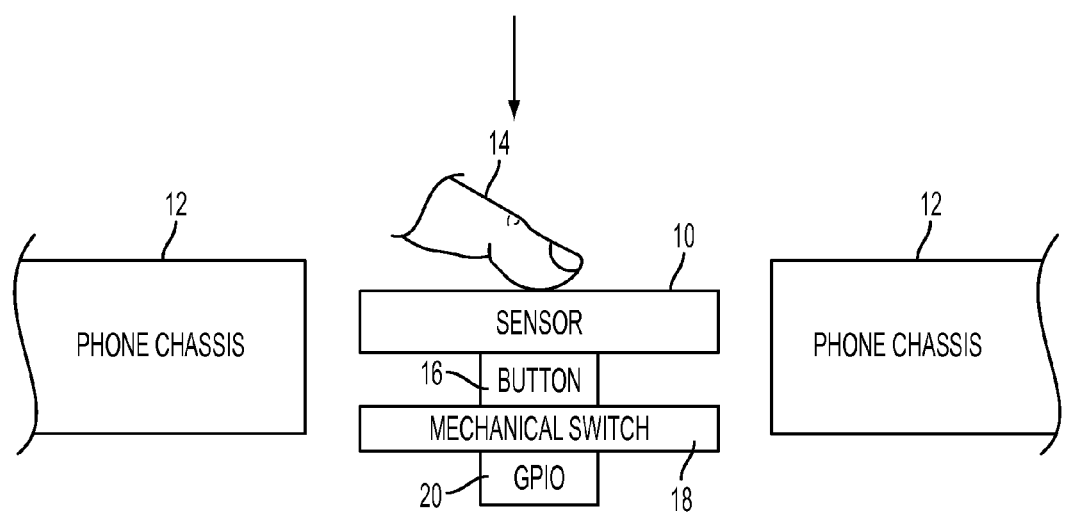
FIG. 3 is a schematic drawing which is identical to FIG. 2, except the sensor is depressed on the button, according to aspects of embodiments of the disclosed subject matter.
Figure 4:
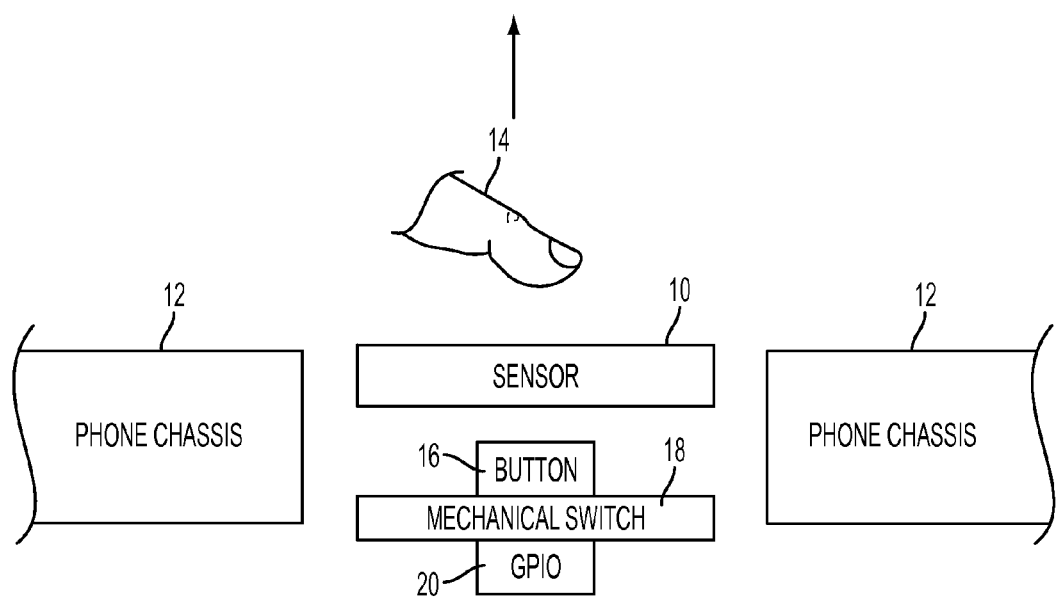
FIG. 4 is a schematic drawing which is identical to FIG. 1, except the finger has been lifted off of the sensor, according to aspects of embodiments of the disclosed subject matter.

According to aspects of the disclosed subject matter, an assembly of elements in a host electronic device may comprise, as an example, the electronic device having a sensor of a biometric sensing device, such as a fingerprint scanner, which may be integrated with a host electronic device such as a portable computing device, a personal digital assistant ("PDA"), a pad device, a personal portable communication device, such as a cell phone, or the like. The biometric sensor may be positioned on a housing of the host electronic device, including, e.g., proximate to or integral with a button-switch on the host electronic device (e.g., the "home" button on a cell phone).

The biometric sensor may be integrated with the structure of the button or an operating mechanism for the button, e.g., as shown in co-pending U.S. Pub. No. US2011-0298711A1, published Dec. 8, 2011, by Dean et al. entitled INTEGRATED FINGERPRINT SENSOR AND NAVIGATION DEVICE, e.g., in FIGS. 8A and 8B and accompanying text, also described herein.

The biometric sensor may be separated from the button, e.g., by a spring. When a finger depresses the biometric sensor, the spring can be compressed and can contact the button which may then also be depressed. The depression of the button can then produce one or more of the following acts, including powering on or powering up the host electronic device and/or the biometric sensor, or in, e.g., a tiered wakeup system, e.g.,: i) the biometric sensor, i.e., the fingerprint scanner can power on or power up (wake up from a lower power sleep mode), ii) the sensor can take at least a partial scan of a biometric object to be scanned, e.g., a finger, and iii) the host electronic device can be at least powered on or powered up, or can be caused to perform a function, such as an authentication function or part of an authentication function. This is discussed in more detail in U.S. Provisional Patent Application Ser. No. 61/751,739, entitled TIERED WAKEUP STRATEGY, filed on Jan. 11, 2013, co-pending with the present application and owned by the assignee of the present application.

FIGS. 1-4 illustrate an assembly of an electronic device in which a sensor 10 of a fingerprint scanner is at least partly contained in the host electronic device such as a cell phone. The cell phone can have a housing, e.g., a chassis 12 and the sensor 10 can be positioned in an opening in the chassis 12. The sensor 10 may be as an example imbedded in a plastic or glass button 16 upon which a user can place a finger 14. The button 16 may be positioned underneath the sensor 10, and may be attached to a mechanical-switch 18 such as the "home" button on a cell phone. A general purpose input/output (GPIO) mechanism 20 may be linked to the mechanical switch 18. A spring (not shown) may be positioned between the sensor 10 and the button 16. When no force is exerted on the sensor 10, the spring can bias the sensor 10 apart from the button 16. The sensor 10 may comprise a flexible material such as Kapton™ tape, upon which may be printed and/or etched and/or otherwise grown or deposited, metallic leads/traces, i.e., serving, e.g., as electrodes and forming sensor elements of the biometric sensor 10, such as transmit or receive electrodes in a capacitive gap linear sensor array or a capacitive 2D swipe or placement array as are well known in the art.

In operation, referring to FIG. 1, when the finger 14 is away from the sensor 10, the fingerprint scanner and or the fingerprint sensor as a whole, and also perhaps any circuitry on the host electronic device that operate in response to or in cooperation with signals received from the sensor 10, can be off or at least in a lower power "sleep" mode. Such a mode can be at or near a lowest power state possible, and may be configured in such mode not to respond to a finger 14 coming down on or in the vicinity of the sensor 10. When the finger 14 comes down on to or into the vicinity of the sensor 10 (see FIG. 2), the fingerprint scanner may still be in an off or a sleep standby mode until the button 16 is depressed by the sensor 10 (see FIG. 3). The actuation of the mechanical switch 18 by the sensor 10 depressing the button 16 can then turn on or awaken the fingerprint scanner, e.g., via the a general purpose input/output GPIO mechanism 20 operated by the button 16 and/or awaken other circuitry or modules in the low/lower power mode associated with the sensor 10 and/or the host electronic device in the process(es) of user authentication via signals received from the sensor 10.

The sensor 10 can then immediately capture a scan of the finger 14 or at least a partial scan of the finger 14, e.g., one or several linear array scans or a 2D segment scan less than the whole fingerprint image, while the button 16 is being depressed. This partial scan may then be used, e.g., to verify that a finger 14 is on the button 16, e.g., for purposes of waking the sensor 10 entirely and/or other circuitry/modules of the overall user authentication system (not shown), including the host electronic device or portions of the host electronic device. In this manner, e.g., by the time the user releases the button 16 or swipes a finger across the button and the resident fingerprint image sensing leads/traces (see FIG. 4), a full fingerprint image of the finger of the user can have been captured as part of the same "press and release" action the user would have performed utilizing the resident embedded sensor 10 had the sensor been separate from the button 16, i.e., not integrated with or contained in/on the button 16, as is well understood in the art. Moreover, as discussed below, the depression of the switch button 16 actuating the switch 18 may initiate any one of several other possible forms of tiered wakeup strategies in addition to the one just discussed.

It should be appreciated that the presently disclosed subject matter provides numerous advantages. For instance, the host electronic device can be utilized to enable a user to simultaneously activate a plurality of functions, e.g., two, by the press of the button 16, as opposed to sequentially pressing two buttons. As a result, the complexity and cost of the host electronic device and also the biometric authentication system can be reduced, and the time to activate multiple functions can be reduced. Also, the fingerprint scanner and/or its image sensor 10 can be enabled to remain in the lowest possible power state because the scanner and its image sensor 10 does not, e.g., have to continuously look to sense the presence of an object on or over the sensor 10 leads/traces, or periodically, but still, quite often poll for such presence an object, e.g., the finger 14.

Still the sensor 10, and ultimately the entire fingerprint image scanner and the entire authentication system, including portions on the host electronic device, and, further the host electronic device itself, can be awakened and respond to the first touch of the finger 14. The depression of the button 18, closing of the switch 16 and actuation of, e.g., the GPIO circuitry 18 as the finger is placed on the sensor 10 and/or swiped over the sensor 10 initiates the necessary wakeup/power-up functions. The scanner can be powered up or powered on simultaneously with the host electronic device being powered up or powered on, and a computing device on the sensor 10 and/or on the scanner and/or on a computing device on the host electronic device can be configured to participate in the wakeup/power-up functions to accomplish authenticating the user whose finger is being sensed on the sensor 10.

The sensor 10, e.g., formed of a flex material with printed traces thereon, may be protruding from the opening in, e.g., the host electronic device housing chassis 12, as illustrated in the above referenced co-pending patent application and a switch or switches disposed underneath the flexible material of the sensor 10 for manipulation as the flex material is manipulated. Simultaneously the finger 14 can be being scanned. As an alternative, also as shown in the above referenced patent application, the scanner traces may be on a substrate, such as a flex substrate, that is integrated into or onto, e.g., the upper surface of the button 16 and as the switch 18 moves with the button 16, the sensor 10 substrate functions to sense the object, e.g., the finger 14. This is as opposed to the button 16/switch 18 being moved by the manipulation of the sensor substrate. Such a button/switch, as seen in the co-pending U.S. Patent Publication US2011/0298711 A1, referenced above, can be manipulated in many directions, e.g., like a joy stick user interface apparatus.

The present disclosed subject matter provides a digital device, such as a portable personal digital assistant, digital pad device, portable phone or the like, that contains an authentication apparatus, such as a finger sensor for sensing a fingerprint image, which can operate in a minimal power consumption mode, e.g., by employing a tiered wakeup strategy according to aspects of the disclosed subject matter. When the sensor 10, and potentially he entire scanner and authentication system as a whole as well, is/are in a very low/lowest power state and the controller of the sensor receives information indicating the sensor 10 is detecting the presence of an object that may be sensed for an image, such as a finger 14, on or in the vicinity of the sensor apparatus, e.g., by the depression of the button 16, the sensor 10 may not have enough information initially to determine that there is an actual finger 14 on or in the vicinity of the sensor 10, and therefore, the sensor 10 may not act right away, e.g., to wake up the scanner and/or the authentication system and/or the host. Instead, the sensor 10, as an example, can wake a processor, such as a controller or microprocessor, e.g., a CPU in/on the sensor 10. The processor in/on the sensor 10 apparatus can then do a more sophisticated analysis (e.g., a variance calculation, such as a history of variance or a smoothed variance of patterned image data for all or part of a frame of image data, for an image or images, as is discussed by way of example in U.S. Pat. No. 7,474,772 B2, to Russo et al. entitled SYSTEM AND METHOD FOR A MINIATURE USER INPUT DEVICE, issued on Jan. 6, 2009, or a frequency calculation, or anti-spoofing techniques, to determine a finger is on or in the vicinity of the sensor 10, e.g., as discussed in U.S. Pat. No. 7,463,756 B2, entitled FINGER POSITION SENSING METHODS AND APPARATUS, issued to Benkley on Dec. 9, 2008, etc. and, e.g., only wake the host electronic device if some criteria or criteria from such testing is/are met. Such criteria can be selected, e.g., as being sufficient to indicate the presence of an actual finger to image for authentication to access the host electronic device.

Therefore according to aspects of embodiments of the disclosed subject matter, as an example, the sensor 10 can conduct at least two steps in a screening process before it wakes up the host. This operation of the sensor 10 and/or other parts of the authentication system, including, perhaps a portion(s) of the host electronic device may be independent of, or in conjunction with the actuation of the GPIO apparatus by the depression of the switch 18 by the user pressing on the button 16 when pressing down on the sensor 10 substrate. That is, even if the button 16 is depressed, this may not be sufficient to initiate the wakeup/power-up functionalities, e.g., where the authentication system or parts thereof have done or do a preliminary check and determined or determine the object in the vicinity of the sensor 10 substrate is not a bionic, e.g., a finger 14, but some other object from which authentication cannot be done. The authentication system may also have the capability of doing such a preliminary check before the button 16 is depressed at all, i.e., as the object approaches the button and is sufficiently in the vicinity of the sensor for the fingerprint image to be sensed or to be begun to be sensed.

FIG. 5 illustrates, by way of example only, stages that can be involved in a tiered screening process conducted by a sensor 10 before some portions or all of an associated host electronic device 100 (shown in FIGS. 6 and 7) can be powered up or powered on, e.g., from an off mode or at least a sleep mode. At Stage 1, a low-power wake on event ("WOE") circuit, e.g., on the sensor 10 can be polling while, e.g., a high power processor 40 (FIG. 7) on the sensor 10, e.g., a sensor CPU, is off or in sleep mode. At Stage 2, the WOE, e.g., on the sensor 10 can have ceased polling, and the sensor CPU 40 can have been powered up to a low power operating mode, or been removed from a sleep mode into the low power operating mode, e.g., conducting calculations as noted above, e.g., on a small number of linear array scans or on a small image area ("frame") to validate the presence of a an object to be imaged, e.g., a finger.

At Stage 3, the WOE can have ceased polling, and the hosting electronic device 100, e.g., the CPU 50 of the electronic device 100 can have been turned on or powered up to a full power operating level to receive and process the results of the imaging the finger by the sensor 10, i.e., as examples, reconstructing the fingerprint image, extracting minutia from the image and/or authentication of the user of the host electronic device 110 by matching the image or minutia to a stored image or stored minutia template.

It should be appreciated that the system provides numerous advantages. For instance, the sensor 10 can employ multiple checks in a tiered wakeup strategy, which can include at the least the three stages just discussed before waking the host electronic device 100, or in some embodiments any more of the host electronic device 100, e.g., some parts or all of the CPU 50 needed for the early processing to determine an object that it is desired to image, e.g., a finger, is on or near the sensor 10, in order to prevent false wakeups, thereby minimizing overall power consumption.

It should be noted that the system can have numerous modifications and variations. For instance, in an embodiment, if the user grips a system such as a phone is his/her pocket where, e.g., the palm of the user's hand is in the vicinity of the sensor, then the sensor WOE can determine the presence of what may be the object to be sensed, i.e., a finger, e.g., through the bulk finger (object) presence detection that occurs during polling of the sensor's bulk presence detector, and can then wake up the sensor's processor, e.g., the sensor's CPU 40. The sensor's CPU 40 can then do a more extensive analysis of the data, e.g., determine that it looks like a finger (i.e., because the palm of the hand also has ridges and valleys, but not like those of a finger, so that frequency of presence, or statistical variation or difference sums, or like techniques can be utilized to distinguish a finger proximate the sensor 10 from a palm proximate the sensor 10, etc).

In order to prevent this preliminary checking for the presence of a bona fide object, to be sensed for authentication, from happening over and over again while the user grips the phone this way, the host electronic device, i.e., the phone, may send a message, e.g., to the CPU 40 in the sensor 10 indicating that the object is not a finger, and to cease trying to identify it as one, at least until this particular object is sensed to have cleared the vicinity of the sensor 10. In response, e.g., the sensor CPU 40 can command the WOE to watch for the object to leave the sensor 10 (i.e., where as the WOE normally watches for the object to land on or in the vicinity of the sensor 10). When the object leaves the vicinity of the sensor 10, the WOE circuitry on the sensor 10 may be programmed to respond, e.g., in two ways: i) it can either wake the sensor CPU 40 to indicate that this has happened, and the sensor CPU 40 logic can decide what to do next or ii) alternatively, the WOE circuitry can immediately rearm itself and not wake, e.g., the sensor CPU 40 until another object lands on or in the vicinity of, e.g., the sensor elements 26 (FIGS. 6 and 7). In this way, the host electronic device 100 can better avoid false positives, i.e., only be powered on or powered up one time for each object coming in contact with or in the vicinity of the sensor 10, which can lower overall power requirements dramatically.

Depending on the result of such further detailed testing the sensor CPU 40, which, as noted may be working in concert with some parts or all of the host electronic device CPU 50, or other parts of the host electronic device 100, can then wake up the host electronic device 100 or the CPU of the host electronic device 100, for, e.g., full authentication processing. It will be understood, that authentication processing may also be accomplished using the sensor CPU 40 and memory on the sensor 10, with the host electronic device 100 only being powered up ("wakened") or powered on in conjunction with such authentication being performed on the sensor 10 or after such authentication is performed. The host electronic device 100 may then, as an example, conduct a further part of the authentication process itself, such as verifying the authentication and/or acknowledging the receipt of the authentication, all of which is discussed by way of example in U.S. Patent App. Pub. Nos. US2011/0083170 A1, entitled USER ENROLLMENT VIA BIOMETRIC DEVICE, published on Apr. 7, 2011, and US 2011/0083018 A1, entitled SECURE USER AUTHENTICATION, published on Apr. 7, 2011, each of which is assigned to the assignee of the present application.

Therefore, according to aspects of the disclosed subject matter, the power consumed by the sensor 10 apparatus being small compared to the power consumed by the host system 100, when the host electronic device 100 is off or at least in a low-power "waiting-for-finger" WOE mode, it is important that the sensor 10 not wake the host electronic device 100 until absolutely necessary. Even if the sensor 10 consumes slightly more power and even if the sensor 10 some resources of the host electronic device 100 in the process, without waking of powering on the entire host electronic device 100, in order to be more certain that an actual finger is present, the overall system power consumption is lower if the WOE logic causes false wakeups of the host to be eliminated or at least minimized. To facilitate this, a tiered approach can be used according to aspects of embodiments of the disclosed subject matter along with configuration noted above of the sensor 10 embedded in or on the button 16.

Most of the time, the sensor 10 can, e.g., be in an ultra-low "waiting-for-finger" WOE mode. When a finger or another conductive object is initially detected, e.g., utilizing a bulk finger detection sensor, the "waiting-for-finger" WOE logic can wake, e.g., the sensor CPU 40, which may then, e.g., scan several lines of data from the proximate object and process it (e.g., using a variance or frequency or some other algorithm as noted above) to determine whether a bona-fide finger is on or in the vicinity of the sensor sensing elements or whether the event that triggered the sensor CPU 40 to wake up was a false alarm. By employing these preliminary checks before waking the host electronic system or even other portions of the authentication system as a whole, e.g., portions of one or more of the CPUs 40, 50, false wakeups of some parts or all of the host electronic device 100, are prevented or at least significantly reduced, again, reducing overall power consumption by the host electronic device 100.

It will be understood by those skilled in the art that according to aspects of the disclosed subject matter there can be provided a host electronic device 100 containing a fingerprint or other biometric sensor 10 that consumes power in an amount that is very small compared to the total power consumed by the host electronic device 100. The biometric sensor 10, can be a conventional fingerprint sensor of a variety of types, e.g., capacitive linear and two dimensional arrays, optical arrays, piezoelectric arrays, resistance arrays and the like. The sensor 10 can be positioned on the host electronic device 100, on or in the vicinity of a button 16 that can actuate a mechanical switch 18 when an object, e.g., a finger, is placed on the sensor 10.

The object can be sensed and imaged, e.g., for authentication of a user of the host electronic device, or to provide input and/or control to the host electronic device 100. At the same time, the sensor 10 can work in conjunction with a wake-on-event module, including, e.g., a sensor processor 40, such as a computer processing unit (CPU) 40. This cooperation can serve to perform at least two important power consumption limitation functions.

First, the sensor 10, in cooperation with the WOE logic associated with the sensor 10 can detect or at least begin to detect that the object placed on the sensor or about to be placed on the sensor is not a bona fide biometric the imaging of which can be used for authentication even before the button 16 is mechanically depressed. Thus, the sensor 10 and host electronic device 100 can be prevented from response to the actuation of the switch 18 when the button is depressed as the object contacts the sensor 10. As this detection can be begun as the object approaches the sensor 10 and then completed after the button 16 is depressed, the system can hold in abeyance reaction to the button 16 being depressed pending the outcome of the bona fides analysis of the WOE logic.

Second, when the host electronic device is in an off or a low-power mode waiting to turn on or wake up due to the presence of a finger to be imaged and processed, the finger sensor 10 and the WOE logic can perform the bona fides wake-on-event analysis described after the button 16 has been depressed. The host electronic device 100, and other circuitry not yet powered on or powered up, therefore, can remain in that state, despite depression of the button 16, until after the WOE bona fides analysis is done, and thus, not wake the host electronic device 100, or at least portions thereof not needed for the user authentication process, at least until it is determined that an actual finger is present.

Turning now to FIGS. 6 and 7, there is shown a partly schematic top view of a biometric object sensor 10, such as a fingerprint sensor 20, embedded in a housing 12 of a host electronic device 100, according to aspects of embodiments of the disclosed subject matter. FIG. 7 shows a cross-sectional view along line 7-7 of FIG. 6. The biometric object sensor 10 may be a fingerprint image sensor, such as a linear one dimensional array capacitive gap sensor 22 comprising a transmitter or receiver plate 24 and a plurality of opposite, i.e., receiver or transmitter plates 26, which may be formed on a substrate 28, such as a flexible substrate made from, e.g., Kapton® tape and having the transmitter and receiver traces 26 printed on the flex tape as is well known in the art.

The biometric object sensor may be embedded into the housing 12 of a host electronic device 100, such that the sensor elements 24, 26 are protected by a protective coating 30, which may also be transparent. Pixel locations are defined in the linear one dimensional gap capacitive biometric image sensor 22 at the gap 48 formed at each of the junctions between a transmitter/receiver trace 26 of the plurality of transmitter/receiver traces 26 and the single opposite receiver/transmitter plate ("trace") 24. The one dimensional linear array biometric object sensor 22 is shown in FIGS. 6 and 7 as cut away, as is the housing 12 itself, and the ellipsis "..." shows that not all of the plurality of transmitter/receiver traces 26 are shown in FIG. 7. The traces 26 are shown to be perpendicular to the single opposite receiver/transmitter trace 24 and separated by spaces.

FIG. 6 shows that the single transmitter/receiver 24 trace is connected within the housing 12 of the host electronic device 100 to both a sensor computing device 40, e.g., in the form of a sensor integrated circuit (IC) CPU 40 and to a host electronic device computing device 50, e.g., in the form of one of at least one host electronic device I/C CPUS 50. It will be understood that the biometric imaging and authentication operations may be shared between the sensor computing device 40 and the host computing device 50. Therefore, the tiered wakeup may similarly be shared. As an example, even when the host electronic device 50 is off or in a very low power mode, such as a sleep mode, the host electronic device computing device 50 and the sensor computing device 40 may share memory (not shown); the shared memory may reside on the sensor computing device 40 or the host electronic device computing device, or both, or may be wholly or partly external to one or both of the sensor computing device 40 and the host electronic device computing device 50.

More particularly, even though the sensor may consume slightly more power in order to be "sure" whether or not an actual finger is present, the overall system power is lower if the sensor can prevent false power-ons or wakeups of the high power consuming host. To facilitate this, according to aspects of the disclosed subject matter, the sensor can employ a tiered wakeup strategy. Most of the time, the sensor is in an ultra low power waiting-for-finger mode. When a finger or another conductive object is detected on or in the vicinity of the sensor elements, the WOE "waiting-for-finger" logic on the sensor can wake the CPU of the sensor, which can then scan several lines of data and process it (e.g., using a variance or some other suitable algorithm, as discussed above) to determine whether a bona-fide finger has landed on or is in the vicinity of the sensor elements or whether the event that triggered the sensor to wakeup its CPU is a false alarm. Should the sensor CPU determine that a bone-fide finger has landed on or in the vicinity of the sensor, the sensor can then wake up the host. The system can therefore operates on minimal power.

It will be understood by those skilled in the art that the disclosed subject matter relates to a method and apparatus that may comprise a biometric authentication system that may comprise a biometric image sensor, such as are well known in the art, e.g., as disclosed in one or more of the above referenced published non-provisional patent applications and patents, in an operative position with respect to a mechanical switch on a host electronic device and configured to sense biometric characteristics of a biometric object while the biometric object is operating the mechanical switch. That is, by way of example only, the biometric image sensor may be in or on a flexible or rigid substrate, and in, on or above the mechanical switch, such that, e.g., the pressing on and/or deforming of the flexible or substrate moves at least one element of the mechanical switch with respect to at least one other element of the mechanical switch and thus actuates (closes or opens) the mechanical switch. The actuation/operating of the mechanical switch providing at least one of input and control to the host electronic device. It will be understood that by "mechanical switch" is meant a switch is meant a switch with such moving parts as opposed, e.g., to an electric switch such as a solenoid or an electronic switch, such as a transistor.

The apparatus and method may also comprise a wake on event logic, of which numerous examples are discussed above, with numerous functionalities, but all with the common functionality of conserving power in part or all of one or more of the sensor, authentication g apparatus, host electronic device, etc. Many possibilities for doing so exist, such as are discussed above, e.g., tiered wake-up strategies and avoiding false positive wake-ups, e.g., through bona fides analysis of an object in or on the sensor, such as, e.g., analyzing partial fingerprint images as is discussed in U.S. Pat. No. 7,474,772 B2, entitled SYSTEM AND METHOD FOR A MINIATURE USER INPUT DEVICE, issued to Russo et al., on Jan. 6, 2009, and U.S. Pat. No. 7,463,756 B2 entitled FINGER POSITION SENSING METHODS AND APPARATUS, issued to Benkley on Dec. 9, 2008, or sensing physical characteristic of a live finger, such as is discussed in U.S. Provisional Patent Application 61/616,112, entitled BIOMETRIC OBJECT SENSOR AND METHOD, filed on Mar. 27, 2012, to which the present application claims priority.

As an example, power consumption limitation can be carried out with tiered wake-up strategies and the like in cooperation with at least one of the biometric image sensor, authentication apparatus and the host electronic device to the extent separated in location and/or function in this regard. The disclosed subject matter may then be configured to at least delay any response by the biometric image sensor or the host electronic device, or any other module participating in the power consumption limitation strategy, such as, the tiered wake-up strategy and or bona fides elements and circuitry that increases power consumption in any or all of these, e.g., the biometric image sensor or the host electronic device, beyond that needed for the performance, by at least one of the biometric image sensor and the host electronic device, of the bona fides analysis of an object being sensed while operating the mechanical switch, until a positive completion of the bona fides analysis determines that the object being sensed is an object desired to be sensed to perform a user authentication.

That is to say, as an example, the bona fides determination circuitry/module (not shown) may be a separate apparatus or may share some parts or all of its function with other elements of the biometric authentication system, the host electronic device, etc. In either case, the tiered wake up logic may still need to be powered-on and powered-up to provide input to the bona fides circuitry. That input may be, e.g., partial fingerprint images, such as one or more scanned lines from a linear array sensor or a frame or part of a frame from a 2D swiped array or a portion of the sensor outputs from a 2D placement sensor. In such cases, the some parts or all of the sensor, the fingerprint image authentication apparatus, the host electronic device and perhaps other modules/circuits may nee to be powered-on and powered-up sufficiently to perform those functions in enabling the bona fides analysis to occur.

It will be understood by those skilled in the art that the claimed limitation of no "increased power consumption . . . beyond that needed for the performance . . . of the bona fides analysis, can and will vary from authentication/host electronic device system to system, due to the components and functions selected to perform the bona fides analysis, including providing adequate inputs into the bona fides analysis and enabling the bona fides analysis module/circuitry to communicate the results of the analysis to one or more other parts of the authentication system and/or host electronic device, the level of error/margin for error for a given design, the particular tiered wake-up strategy currently being implemented by the authentication/host electronic device system, etc. It will be understood, however, that those skilled in the art can easily determine, taking into account all of these factors and more, an appropriate level of power consumption in the individual devices and/or overall in the whole system to initiate, carry out and/or complete and communicate the results of the bona fides analysis, e.g., in each of those stages. The claimed subject matter, therefore, is to so limit the power to that so needed and not go forward with any power consumption, e.g., from carrying out additional steps in whatever wake-up strategy is being used, tiered or otherwise, or in preparing to obtain or obtaining the biometric, or the like until after the bona fides analysis indicates that there is an object that is a biometric of the type desired to be imaged and compared for authentication purposes on or in the vicinity of the button, and regardless of whether the button itself has been depressed fully or partly or at all and specifically to ignore and prevent any other responses to and object being sensed in the vicinity of the sensor, of the button being depressed or partly depressed or the like, absent a positive bona fides analysis result, e.g., that there is present a finger of living human on or near the biometric image sensor, i.e., on or near the button. The biometric authentication method and system may further comprise the wake on event logic being configured to complete a wake on event power-up or power-on sequence for at least one of the biometric image sensor and the host electronic device in response to a positive outcome of the bona fides analysis.

The system and method may further comprise the biometric image sensor comprising a sensor substrate comprising a flexible material having sensor elements formed in or on the flexible material and configured to deform enough to operate the mechanical switch. The sensor elements may, e.g., be on a sensing side of the substrate, e.g., the flexible substrate, or contained within the substrate or on a side opposite the sensing side. When on the sensing side the sensor elements will need to be covered with a coating to prevent contact by the finger of the user or other external objects with the sensor elements. The bona fides analysis may comprise an analysis of a partial fingerprint image in contact with or in the vicinity of the biometric image sensor. The biometric authentication system and method may further comprise the wake on event logic being is configured to cause the commencement of the bona fides analysis when the wake on event logic senses an object in the vicinity of the sensor, or in contact with the sensor and before the button is depressed or in contact with the sensor and upon or after the button being depressed. It will be understood by those skilled in the art that the meaning of "in the vicinity" is also variable with device to device, e.g., depending on the type of sensing of the biometric being carried out, the type of bona fides analysis being used, e.g., analysis of a partial fingerprint image, of physical properties of the object moving toward or on the sensor elements, the characteristic of some electrical, electromagnetic or other radiation interacting with or reflected by, or the like, the object being sensed. For purposes of interpreting the claims, "in the vicinity" means close enough so that whatever input is needed to perform some part or all of a bona fides analysis, including input that might otherwise trigger some part or all of whatever wake-up strategy(ies) is/are being employed, is able to be effectively and accurately detected by the biometric image sensor elements and/or any auxiliary finger presence detector may be present separate from the biometric image sensor elements.

The method may comprise a biometric authentication method which may comprise using a biometric image sensor in an operative position with respect to a mechanical switch on a host electronic device to sense biometric characteristics of a biometric object while the biometric object is operating the mechanical switch, the operating of the mechanical switch providing at least one of input and control to the host electronic device; and using wake on event logic, cooperating with at least one of the biometric image sensor and the host electronic device, to at least delay any response by the biometric image sensor or the host electronic device that increases power consumption by either the biometric image sensor or the host electronic device, beyond that needed for the performance, by at least one of the biometric image sensor and the host electronic device, of a bona fides analysis of the biometric object being sensed while operating the mechanical switch, until a positive completion of the bona fides analysis determines that the object being sensed is an object desired to be sensed to perform a user authentication.

Also disclosed is a machine readable medium storing instructions that, when executed by a computing device, cause the computing device to perform a method, the method comprising: using a biometric image sensor in an operative position with respect to a mechanical switch on a host electronic device to sense biometric characteristics of a biometric object while the biometric object is operating the mechanical switch, the operating of the mechanical switch providing at least one of input and control to the host electronic device; and using wake on event logic, cooperating with at least one of the biometric image sensor and the host electronic device, to at least delay any response by the biometric image sensor or the host electronic device that increases power consumption by either the biometric image sensor or the host electronic device, beyond that needed for the performance, by at least one of the biometric image sensor and the host electronic device, of a bona fides analysis of the biometric object being sensed while operating the mechanical switch, until a positive completion of the bona fides analysis determines that the object being sensed is an object desired to be sensed to perform a user authentication.

It will also be understood by those skilled in the art that the disclosed subject matter provides a biometric authentication system wherein a biometric image sensor can be incorporated into a user authentication apparatus providing user authentication, e.g., for controlling access to one of an electronic user device or an electronically provided service. The electronic user device may comprise at least one of a portable phone and a computing device. The electronically provided service may comprise at least one of providing access to a web site or to an email account. The biometric image sensor may be incorporated into a user authentication apparatus providing user authentication for controlling an online transaction. The user authentication apparatus may be a replacement of at least one of a user password or personal identification number. The user authentication apparatus may be incorporated into an apparatus providing user authentication for controlling access to a physical location, or providing user authentication demonstrating the user was present at a certain place at a certain time. The user authentication apparatus may be incorporated into an apparatus providing at least one of a finger motion user input or navigation input to a computing device. The user authentication apparatus may be incorporated into an apparatus providing authentication of the user to a user device and the performance by the user device of at least one other task, e.g., specific to a particular finger of the user. The user authentication apparatus may be incorporated into an apparatus providing user authentication for purposes of making an on-line transaction non-repudiatable.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. Such embodiments are provided by way of example only. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. Numerous variations, changes, and substitutions will now occur to those skilled in the art without departing from the disclosed subject matter. It should be understood that various alternatives to the embodiments of the disclosed subject matter described herein may be employed in practicing the disclosed subject matter. It is intended that the following claims define the scope of the disclosed subject matter and that methods and structures within the scope of these claims and their equivalents be covered thereby.

What is claimed is:

1. A biometric authentication system comprising:
   a biometric image sensor configured to sense biometric characteristics of an object while the object being sensed is operating a mechanical switch of a host electronic device, the operating of the mechanical switch providing at least one of input and control to the host electronic device; and
   wake on event logic cooperating with at least one of the biometric image sensor and the host electronic device and configured to at least delay a response by at least one of the biometric image sensor and the host electronic device that increases power consumption beyond that needed for performance of a bona fides analysis mode during which the authentication system performs analysis of bona fides of the object being sensed while operating the mechanical switch prior to accessing previously stored biometric enrollment data, with a positive completion of the bona fides analysis determining that the object being sensed is a biometric object desired to be sensed to perform a user authentication,
   wherein the wake on event logic is configured to complete a wake on event power-up or power-on sequence for at least one of the biometric image sensor and the host electronic device in response to a positive outcome of the bona fides analysis, and
   wherein the bona fides analysis comprises an analysis of at least a partial biometric object image captured by the biometric image sensor.

2. The biometric authentication system of claim 1, wherein the object comprises a fingerprint and the bona fides analysis comprises determining whether the object being sensed comprises a finger of a live human being.

3. The biometric authentication system of claim 1, wherein the biometric image sensor comprises:
   a sensor substrate comprising a flexible material having sensor elements formed in or on the flexible material and configured to deform to operate the mechanical switch.

4. The biometric authentication system of claim 3, wherein the wake on event logic is configured to cause the commencement of the bona fides analysis when the wake on event logic senses an object in the vicinity of the sensor elements.

5. The biometric authentication system of claim 3, wherein the wake on event logic is configured to cause the commencement of the bona fides analysis when the wake on event logic senses an object in contact with the sensor elements and before the button is depressed.

6. The biometric authentication system of claim 3, wherein the wake on event logic is configured to cause the commencement of the bona fides analysis when the wake on event logic senses an object in contact with the sensor elements and upon or after the button being depressed.

7. The biometric authentication system of claim 1, wherein the biometric image sensor is incorporated into a user authentication apparatus providing user authentication for controlling access to one of an electronic user device or an electronically provided service.

8. The biometric authentication system of claim 7, wherein the host electronic device comprises at least one of a portable phone and a computing device.

9. The biometric authentication system of claim 7, wherein the electronically provided service comprises at least one of providing access to a web site or to an email account.

10. The biometric authentication system of claim 7, wherein the biometric image sensor is incorporated into a user authentication apparatus providing user authentication for controlling an online transaction.

11. The biometric authentication system of claim 7, wherein the user authentication apparatus is incorporated into an apparatus providing user authentication for controlling access to a physical location.

12. The biometric authentication system of claim 7, wherein the user authentication apparatus is incorporated into an apparatus providing user authentication demonstrating the user was present at a certain place at a certain time.

13. The biometric authentication system of claim 7, wherein the user authentication apparatus is incorporated into an apparatus providing at least one of a finger motion user input and a navigation input to a computing device.

14. The biometric authentication system of claim 7, wherein the user authentication apparatus is incorporated into an apparatus providing authentication of the user to a user device and the performance of at least one other task by the user device specific to a finger of the user.

15. The biometric authentication system of claim 7, wherein the user authentication apparatus is incorporated into an apparatus providing user authentication for purposes of making an on-line transaction non-repudiatable.

16. The biometric authentication system of claim 1, wherein when the analysis of the biometric object image captured by the biometric image sensor to perform the bona fides analysis determines that an object other than a fingerprint is in contact with or in the vicinity of the biometric image sensor, the host electronic device instructs the biometric image sensor to terminate the bona fides analysis regardless of the presence of the object on or in the vicinity of the biometric image sensor.

17. The biometric authentication system of claim 16, wherein another bona fides analysis is not configured to occur until after the object other than the fingerprint is no longer in contact or in the vicinity of the biometric image sensor.

18. The biometric authentication system of claim 1, wherein the wake on event logic is configured to detect the object leaving the biometric image sensor in response to a negative outcome of the bona fides analysis.

19. A biometric authentication method comprising:
  using a biometric image sensor to sense biometric characteristics of an object being sensed while the object is operating a mechanical switch of a host electronic device, the operating of the mechanical switch providing at least one of input and control to the host electronic device; and
  using wake on event logic, cooperating with at least one of the biometric image sensor and the host electronic device, to at least delay a response by at least one of the biometric image sensor and the host electronic device that increases power consumption beyond that needed for performance of a bona fides analysis mode during which the authentication system performs analysis of the bona fides of the object being sensed while operating the mechanical switch prior to accessing previously stored biometric enrollment data, with a positive completion of the bona fides analysis determining that the object being sensed is a biometric object desired to be sensed to perform a user authentication,
  wherein the wake on event logic is configured to complete a wake on event power-up or power-on sequence for at least one of the biometric image sensor and the host electronic device in response to a positive outcome of the bona fides analysis, and
  wherein the bona fides analysis comprises an analysis of at least a partial biometric object image captured by the biometric image sensor.

20. A non-transitory machine readable medium storing instructions that, when executed by a computing device, cause the computing device to perform a method, the method comprising:
  using a biometric image sensor to sense biometric characteristics of an object while the object is operating a mechanical switch of a host electronic device, the operating of the mechanical switch providing at least one of input and control to the host electronic device; and
  using wake on event logic, cooperating with at least one of the biometric image sensor and the host electronic device, to at least delay a response by at least one of the biometric image sensor and the host electronic device that increases power consumption beyond that needed for performance of a bona fides analysis mode during which the authentication system performs analysis of the bona fides of the object being sensed while operating the mechanical switch prior to accessing previously stored biometric enrollment data, with a positive completion of the bona fides analysis determining that the object being sensed is a biometric object desired to be sensed to perform a user authentication,
  wherein the wake on event logic is configured to complete a wake on event power-up or power-on sequence for at least one of the biometric image sensor and the host electronic device in response to a positive outcome of the bona fides analysis, and
  wherein the bona fides analysis comprises an analysis of at least a partial biometric object image captured by the biometric image sensor.

* * * * *